May 24, 1927.

G. H. COOKE 1,629,680

INSTRUMENT FOR LUMINOUS INDICATION OF QUANTITIES

Filed March 30, 1926

Geoffrey Harkwood Cooke
Inventor

Patented May 24, 1927.

1,629,680

UNITED STATES PATENT OFFICE.

GEOFFREY HASLEWOOD COOKE, OF LONDON, ENGLAND.

INSTRUMENT FOR LUMINOUS INDICATION OF QUANTITIES.

Application filed March 30, 1926, Serial No. 98,596, and in Great Britain April 3, 1925.

This invention relates to the luminous indication of varying quantities on opposite sides of a zero mark.

The invention is based on the generally known fact that, by superposing two transparent sheets composed of materials of complementary colours, transmitted light is completely obscured, whilst if one of the complementary colours is made to coincide with a sheet of similar colour, light is transmitted through the duplex similar colour material.

According to this invention, two framed screens are employed, each being composed of an opaque frame of suitable depth and containing a two colour window. The first frame contains two adjacent coloured screens, the first half of which may be red transparent material and the second adjacent half of green transparent material. The second frame contains two adjacent coloured screens, similar as to size and colour to the screens in the first frame, but with the colours transposed or oppositely arranged; in such a manner that when the two framed screens are in register with each other, the red on one screen coincides with the green on the other screen, the green portion of the first screen coinciding also with the red portion on the second screen. The frames of both screens are sufficiently wide or long to prevent light showing through a single thickness of coloured transparent material.

If these screens are moved relatively to each other so as to cause the red to coincide with the red, or the green to coincide with the green, red light or green light is observed passing through both thicknesses of red or both thicknesses of green. By displacing the screens more, a greater width of red or green is observed, until the whole of the red or the whole of the green—depending on the direction of displacement—is observed.

If then one screen of two coloured transparent material is held stationary and the other screen is carried on an adjustable indicating part, so that the junction of red and green on the stationary screen coincides with the junction of the green and red on the movable screen, if the movable screen be moved in one direction a red light will be disclosed, increasing in size as the movement in that direction continues; whilst if the movable screen is moved in the opposite direction, then the red light reduces in size until the zero position is reached, when the red light is extinguished entirely and the green light commences to be exposed and continues to enlarge until the maximum movement in that direction away from zero is attained.

In such an arrangement, with a stationary screen and a movable screen, the position of the zero is stationary and the red light extends from the stationary zero in one direction; whilst if the green is exposed it extends in the opposite direction from the zero position. The position of expanding red or green light may be stationary and the lighted screen be caused to expand equally on opposite sides of the zero position, by arranging both screens to move uniformly in opposite directions, the zero being the mid position of the screens which thus move equally.

In the drawing which accompanies this specification,

Figure 3:
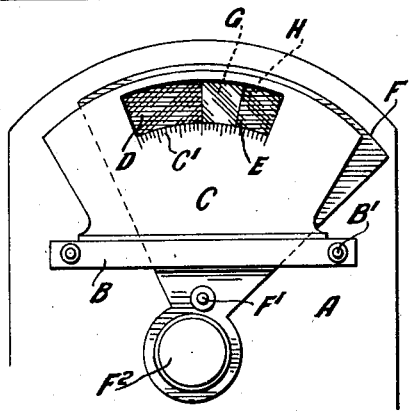

Fig. 3 also illustrates the same apparatus but with the movable screen displaced from the central position.

Figure 4:
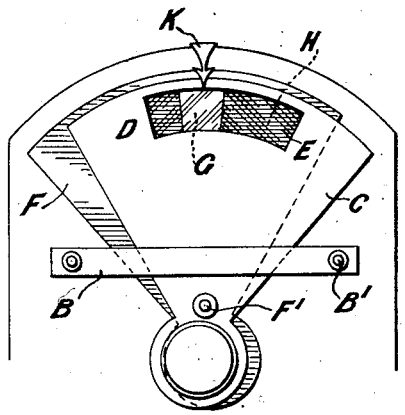

Fig. 4 illustrates an example of construction in which both screens are adjustable to right and left from a central position.

Figure 1:
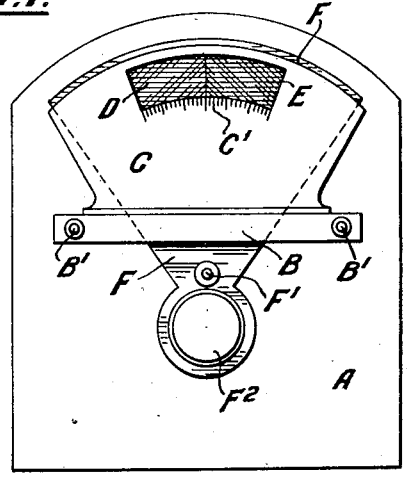
Fig. 1 is a front elevation illustrating an example of construction in which one of the two screens is stationary and the other is adjustable.
Figure 2:
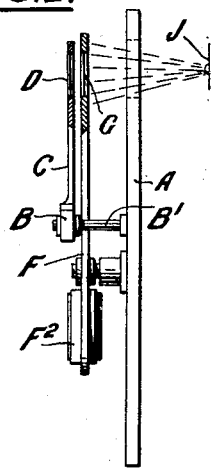
Fig. 2 is a side elevation of the same apparatus.

Referring particularly to Figs. 1, 2 and 3, A is a base board on which the various parts are mounted. B is a bridge piece carried on pillars B¹ attached to the base board A. The bridge piece B carries a stationary screen C containing two windows D and E; a scale may also be marked on the stationary screen C at C¹.

F is a movable screen fulcrumed on the base board A at F¹, and in the instance illustrated a pendulum weight F² carried on the lower end of the movable screen F tends to keep the said movable screen F in a vertical position.

Windows G and H, which are mounted in segmental apertures in the movable screen F, coincide when the movable screen F is in the vertical position, with the windows D and E in the stationary screen, but the said windows G and H are oppositely arranged with regard to colour to the windows D and E; thus if D is a red window and E is a green window, then G is a green window and H is a red window. J is a lamp or reflector for transmitting light towards the windows.

When the movable screen F is displaced as shown at Fig. 3, then a portion of the window G coinciding with a portion of the window E and both being of similar colour, light of that colour is transmitted through the windows G, E from the light J.

On the turning of the movable screen F to the central position, both windows are obscured, but if the movable screen F moves beyond the central position, then a portion of the window H will coincide with a portion of the window D and light will be transmitted of the colour of the said windows.

In the example of construction illustrated at Fig. 4, both screens C and F are movable, and in this example are both pivoted at $F^1$. The equal displacement of both movable screens in opposite directions will maintain the light transmitted through the windows central with regard to a pointer K. This could be accomplished by connecting the screens by suitable toothed gearing not shown in the drawing.

What I claim as my invention and desire to secure by Letters Patent is:—

1. An instrument for luminous indication of quantities, comprising duplex screens, windows of two complementary colours in such screens, means for adjusting one screen relatively to the other screen from the position where each colour portion of one window obscures the opposite colour portion of the other window, to positions where the same colour portion of the window in one screen coincides with the similar colour portion of the window in the other screen, whereby the light visible through the similar coloured windows extends in proportion to the relative adjustment between the screens.

2. An instrument for luminous indication of quantities, comprising in combination a base board, a screen of opaque material fixedly supported therefrom, said screen having a through aperture, transparent material fixed to said screen to cover said aperture said transparent material on one side of the centre of said aperture being of a color different to and complementary to the color on the other side, a second similar screen the transparent material covering its similar aperture being of similar complementary colors but oppositely arranged to the colors of the transparent material of said first screen, a pivot extending from said base board to pivotally support said second screen in a position opposite to, adjacent and parallel with said first screen, and means for adjusting one screen relatively to the other screen whereby the light visible through the similar colored portions of the transparent material of the two screens extends in proportion to the relative adjustment between the screens.

In witness whereof I have hereunto set my hand.

GEOFFREY H. COOKE.